INVENTOR.
Robert C. Schmidt
BY
Davis, Lindsey, Hibben & Noyes

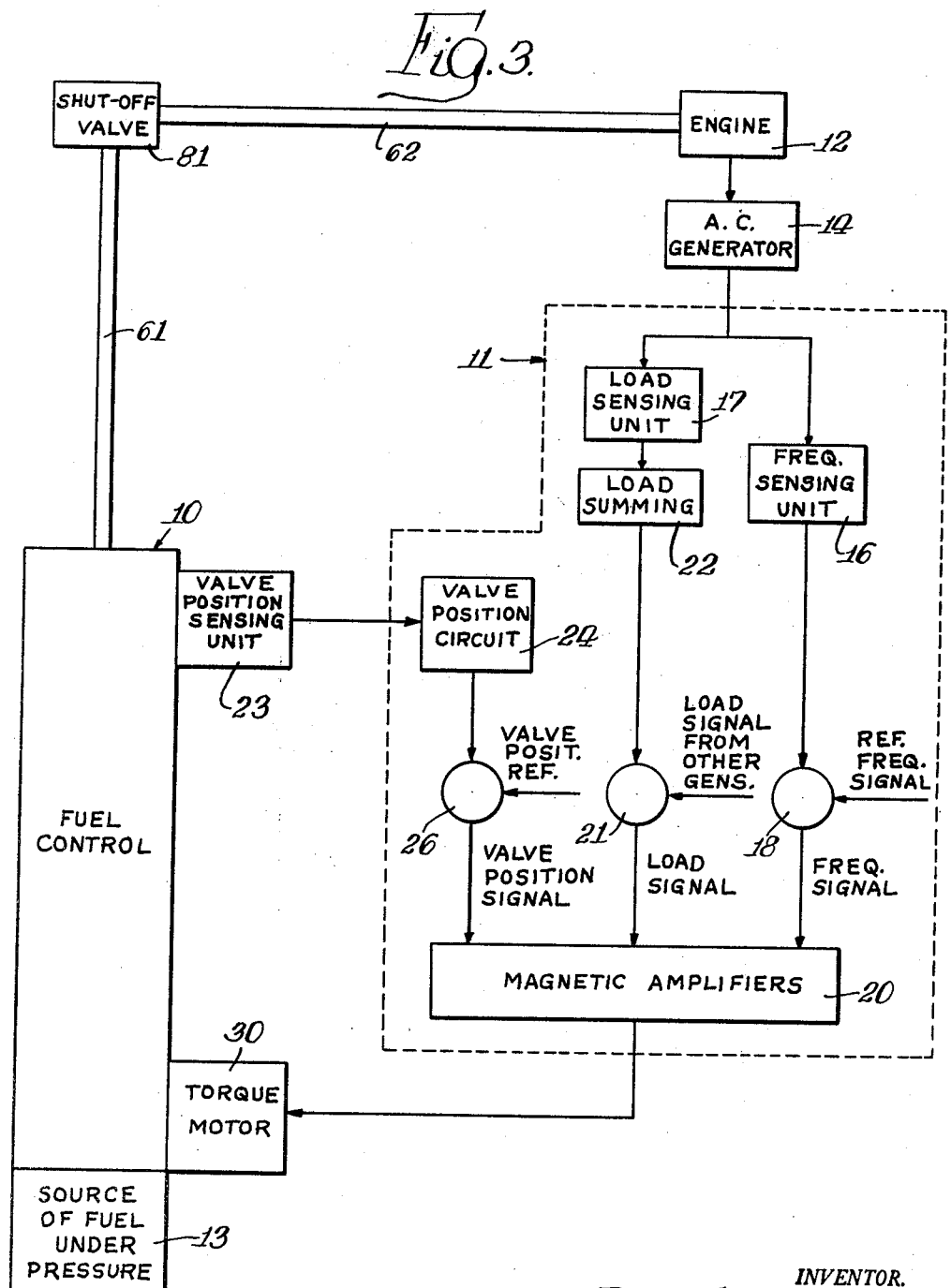

United States Patent Office 3,128,750
Patented Apr. 14, 1964

3,128,750
FUEL CONTROL
Robert C. Schmidt, Columbus, Ind., assignor to Cummins Engine Company, Inc., Columbus, Ind., a corporation of Indiana
Filed Jan. 23, 1961, Ser. No. 84,051
15 Claims. (Cl. 123—140)

This invention relates to fuel controls for internal combustion engines, and more particularly to a fuel control for a diesel engine for varying the flow to the engine in accordance with an operating condition of the engine.

The general object of the invention is to provide a novel fuel control for controlling the flow of fuel to an engine, in which the pressure of the fuel to the engine is utilized to control the flow of fuel to the engine and such pressure is varied in response to an operating condition of the engine.

Another object is to provide a novel fuel control of the foregoing character adapted to co-operate with an engine governor and to respond to changes in the engine operating condition sensed by such governor.

A further object is to provide a novel fuel control of the foregoing character, which is adapted to co-operate with an electric governor and is responsive to signals from said electric governor, varying with changes in the operating condition of the engine.

Other objects and advantages will be apparent upon making reference to the detailed description which follows, and accompanying sheets of drawings in which:

FIG. 3 is a diagrammatic view of an electric governor showing its connection with the fuel control of the present invention.

Figures 1, 2:
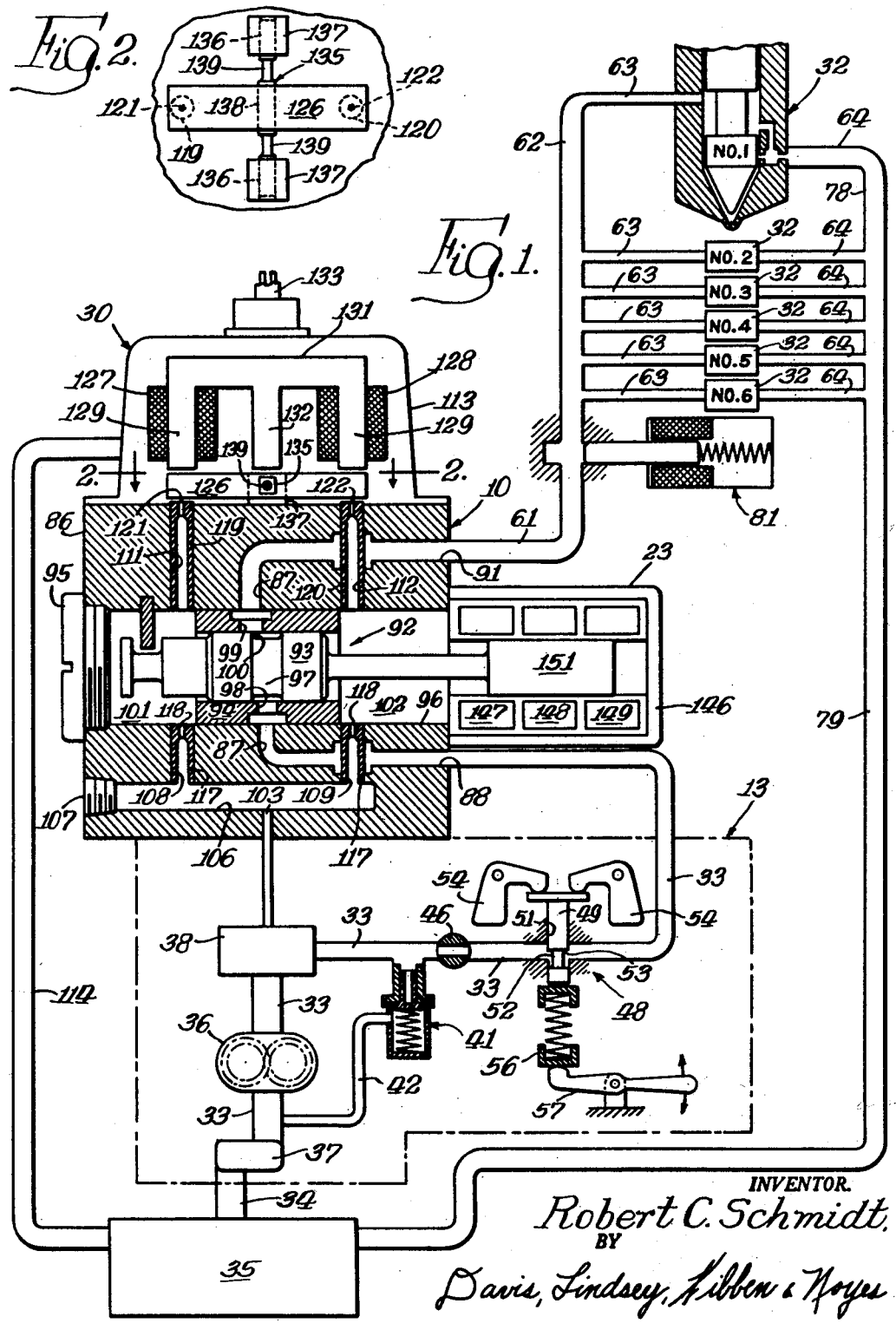
FIGURE 1 is a diagrammatic view of a fuel control embodying the features of the invention.
FIG. 2 is a fragmentary sectional view taken on the line 2—2 of FIGURE 1.

Electric governors have heretofore been provided for internal combustion engines, particularly where the engine is utilized to drive an electric generator and it is desired to maintain the frequency of the generator, and hence its speed, within very close limits. Such governors respond to variations in the load on the generator and variations in the frequency of the generated current to effect a control of the speed of the engine. In such a governor, these factors are integrated to provide a correction signal that is imparted to a means for varying the speed of the engine. Heretofore, such means was utilized to adjust the throttle setting of the engine, usually through a servo-control system or actuator.

With the present invention, the fuel flow to the engine is controlled by a valve means which is shifted by the pressure of the fuel under the control of a signal from an electric governor. Thus, the fuel control of the present invention includes a fuel conduit connected at one end to a source of fuel under pressure, and at its other end to the engine. A valve is provided in the conduit for controlling the flow therethrough. For shifting the valve to obtain such control, I provide at least one chamber at one end of the valve, the chamber being adapted to receive fuel under pressure from the source. Pressure in the chamber is controlled by means for variably restricting a discharge flow therefrom. The degree of restriction of such discharge flow is a function of changes in the operating condition of the engine. The pressure of the fuel from the source is thus utilized to effect a change in the position of the valve, to control the flow of fuel to the engine.

In FIG. 3, the fuel control of the present invention, indicated generally at 10, is illustrated diagrammatically in block form, as are the other components. Such control is also illustrated in detail in FIG. 1. A control device 11, in this instance an electric governor, is also shown, the latter being adapted to provide a control signal to the fuel control 10 which in turn controls the flow to an engine 12 from a fuel supply apparatus 13 constituting a source of fuel under pressure. The engine 12 in this instance is connected to a generator 13 for producing an alternating current having a substantially constant frequency. It will be understood that, while the fuel control 10 to be described hereinafter, is particularly suited for maintaining the speed of the engine 12 and thus the generator 14 at a substantially constant value, the fuel control 10 may also be used in other applications where it is necessary to maintain the speed of the engine 12 within close limits of a desired speed.

The electric governor 11 is of the type adapted to sense changes in the load on the generator 14 and variations in the frequency of the generated current, and to provide an electrical signal proportioned to either or both of these conditions. The device 11 then translates such signal or signals into a resultant compensating signal that is sent to the fuel control 10 which changes the fuel flow to the engine 12 by an amount to compensate for the load and frequency change. In order to prevent the fuel control 10 from over-compensating for a change in load and/or frequency of the generated current, a device such as the electric governor 11 may also include circuitry sensitive to the position of the valve means in the fuel control 10, which controls the flow of fuel to the engine 12. Such circuitry provides another signal, which may be used to decrease the compensating signal as the fuel flow approaches a rate corresponding to that necessary for the changed load and/or frequency condition. When the proper valve position is reached, the signals nullify each other and the valve means remains in such position.

As is illustrated diagrammatically in FIG. 3, the electric governor 11 is connected electrically to the generator 14. Thus, the frequency of the generated current is sensed by a frequency sensing unit 16 and the load on the generator 14 is sensed by a load-sensing unit 17. The frequency sensing unit 16 provides a signal which is sent to an electrical comparator 18. A reference frequency signal from a suitable source is also sent to the comparator 18. The signals are then compared electrically and a resultant frequency error signal proportional to the difference of the two signals is sent from the comparator 18 to the frequency responsive portion of a magnetic amplifier 20. In a similar manner, the load sensing unit 17 provides a signal proportional to the load on the generator 14. This signal is in turn sent to another electrical comparator 21, and then to a load responsive portion of the magnetic amplifier 20. If the generator 14 is of the combination A.C.-D.C. type, that is, one which produces both an alternating and direct current, a load summing unit 22 may be provided in the load sensing portion of the electric governor 11. Under such conditions, another load-sensing unit similar to the unit 17 would be provided for the generated direct current. The signals from each of these units would then be sent to load summing device 22. Such a device compares both A.C. and D.C. load signals from the A.C. and D.C. sensing units 17 and provides a single resultant load signal to the comparator 21. In addition, where one or more generators are to be used in parallel with the generator 14, the load signal from the sensing units 17 or summing devices 22 of the other generators are sent to the comparator 21. A resultant error signal from the comparator 21 is then sent to the load sensitive portion of the magnetic amplifier 20.

As previously mentioned, the electric governor 11 may also include circuitry sensitive to the position of the valve means in the fuel control 10. Such circuitry may include a valve position sensing unit 23, which in this instance is mounted on the fuel control 10 (FIGS. 1 and 3). The unit 23 is adapted to provide a signal corresponding to the position of the valve in the fuel control 10, this signal being sent to a valve position circuit 24 in the electric governor 11. A signal from the valve position circuit 24 may then be sent to an electrical comparator 26 where it is compared to a valve position reference signal also sent to the comparator 26 from a suitable source. A resultant valve position signal is then supplied to the valve position responsive portion of the magnetic amplifier 20.

The relationship between the load signal from the comparator 21 and the valve position signal of the comparator 26 is such that each of the signals oppose each other electrically. Thus, when the valve portion of the fuel control is in a position such as to maintain the output of the engine 13 equal to the load on the generator 14 so that the frequency of the generator 14 is maintained at a desired value, the load and valve position signals cancel each other.

The magnetic amplifier 20 correlates the signals from each of the comparators 18, 21 and 26, and provides a final correcting signal to the fuel control 10. This signal is imparted to an electro-hydraulic device or actuator 30, mounted on the fuel control 10 and comprising a portion thereof. The manner in which the actuator 30 effects a change in the position of the valve means of the fuel control 10 in accordance with changes in the operating condition of the engine 13 will be described more fully hereinafter.

The engine 12 which drives the generator 14 is illustrated as a 6-cylinder diesel type, it being understood that the fuel control 10 could also be used with other types of internal combustion engines. Fuel is supplied to cylinders of the engine 12 by a plurality of fuel injectors, each indicated at 32 in FIG. 1. One injector 32 is used for each cylinder. Such an injector is described in the Reiners Patent No. 2,727,498, issued December 20, 1955, and is adapted to deliver accurately metered quantities of fuel to the associated cylinder of the engine in timed relation to the speed thereof. The quantity of fuel injected by the injectors 32 depends on the pressure of the fuel supplied to the injectors. Such pressure is controlled in the present instance, throughout the normal operating range of the engine, primarily by the fuel control 10. During starting, idle, and maximum speeds, the flow of fuel to the engine is controlled at the source 13.

The source 13 may be a fuel supply apparatus similar to that described and claimed in the aforementioned Reiners patent. Such apparatus comprises generally a housing having a fuel passage 33 therethrough. The inlet end of the passage 33 is connected by a line 34 to a fuel tank or reservoir 35. An engine-driven pump 36 mounted in the housing serves to draw fuel from the tank 35 and provide a flow thereof under pressure through the passage 33. A filter 37 may be interposed between the tank 35 and pump 36.

Fuel leaving the pump 36 passes through a strainer 38, and beyond the latter a by-pass 42 is connected to the passage 33, in which a pressure regulator 41 is mounted. The pressure regulator 41 normally controls the pressure of the fuel at the source 13 by returning a portion of the fuel to the inlet side of the pump 36 through the by-pass 42. Downstream of the pressure regulator is a hand throttle 46. Downstream of the hand throttle 46 is a centrifugal governor device 48 which serves to shut off the flow of fuel to the engine when the latter reaches a predetermined maximum speed. The foregoing is achieved by a shiftable plunger 49 slidably mounted in a bore 51, the plunger having a reduced portion 52 defining a shoulder 53 which serves to close the passage 33 when the engine reaches the maximum speed. Movement of the plunger is effected by a pair of engine-driven centrifugal weights 54 which serve to urge the plunger 49 toward a position closing the passage 33. A spring pack 56 opposes the action of the weights 54. The force of the spring pack 56 is adjustable by a lever 57. Increasing the force of the spring pack raises the maximum governed speed, and vice-versa.

The fuel, after passing through the centrifugal device 48, flows to the fuel control 10 and thence through a line 61 to a common supply rail or header 62. From the rail 62, the fuel flows through a plurality of branch lines 63 to the respective injectors 32. The amount of fuel supplied to the injectors 32 is in excess of that injected into the cylinders, and the excess is returned through branch lines 64 to a common return rail or header 78 and thence by a line 79 to the tank 35. An electrically-operated shut-off valve 81 may be provided in the supply line 61 to positively prevent any fuel flow through the supply line 61 to the injectors when it is desired to shut down the engine.

The fuel control 10, which embodies the features of the present invention, is adapted to be mounted on the fuel supply apparatus 13 for controlling the flow of fuel to the injectors 32 throughout the normal operating range of the engine 12. Such a fuel control generally comprises a fuel conduit or passage adapted to be connected at one end with the source 13 of fuel under pressure and at its other end, with the engine 12, in this instance the injectors 32 thereof. Shiftable valve means is located in the conduit for controlling the flow therethrough, and means is provided for enclosing at least one end of the valve means to define a chamber for receiving fuel under pressure from the source 13 for applying pressure to the one end of the valve means to shift it in one direction. Means is also provided for applying an opposing force to the other end of the valve means. In the present instance, two such chambers are provided, one at each end of the valve means, a differential pressure between the chambers being used to shift the valve means in opposite directions. The fuel control 10 also includes means responsive to an operating condition of the engine for varying the pressure in the respective chambers to thereby control the position of the valve means with respect to the fuel passage. Such means includes branch fuel passages which supply fuel under pressure to the respective chambers at each end of the valve means, and means for controlling discharge of fuel from the chambers, thereby controlling pressure in the chambers. The aforementioned responsive means controls the effective size of openings for the discharge of fuel from the chambers in response to a signal from the electric governor device 11. The valve means includes a portion adapted to co-operate with the device 11 and which provides a signal corresponding to the position of the valve in the fuel passage. Such signal is transmitted to the electric governor 11.

The valve means of the fuel control thus serves to vary the restriction of the fuel passage therethrough, and consequently controls the pressure of the fuel supplied to the engine 12. The power output of the engine will therefore be substantially equal to the requirements of the generator 14, and the latter will be maintained at a substantially constant speed and frequency. Because the fuel control 10 includes means for sensing the position of the valve means and hence the amount of restriction of the fuel passage, an extremely accurate control of the quantity of fuel supplied to the injectors of the engine may be achieved. The aforementioned valve position sensing portion of the fuel control also prevents hunting of the valve whenever it approaches a position corresponding to that necessary to compensate for a change in load upon the engine.

In FIGURE 1, the structural arrangement and components of the fuel control 10 are shown diagrammatically. Thus, in the form of construction illustrated in the figure, the fuel control 10 comprises a housing 86 which in this instance is mounted on the fuel supply unit 13. The housing 86 is provided with a series of interconnected bores and passages forming a main fuel passage or conduit 87 therethrough. The passage 87 is adapted to be connected at one end 88 with a source of fuel under pressure, in this instance the fuel supply unit 13. Such connection may be made directly with the outlet end of the fuel passage 33 of the fuel supply apparatus 13. The fuel passage 87 extends through the housing 86 and has its other end 91 connected to the line 61 and thus to the supply rail 62 for the injectors.

For controlling the flow of fuel through the passage 87, the housing 86 includes valve means, indicated generally at 92, for variably restricting passage 87. Such valve means in this instance comprises a shiftable valve body 93 mounted in a sleeve 94 that is seated in a bore 96 in the housing 86. The valve body 93 includes an annular groove 97 which co-operates with an inlet port 98 and an outlet port 99 in the sleeve 94 to provide a path for fuel across the bore 96. The outlet port 99 is offset relative to the inlet port 98 so that a shoulder 100 formed by the groove 97 will variably restrict the outlet port 99, on movement of the valve body, to thereby effect a control of the fuel flow through the passage 87.

The bore 96 extends through the housing 86 and intersects the passage 87 intermediate its length. One end of the bore 96 is closed by a plug 95 and the other end of the bore 96 is closed by the valve position sensing unit 23 which is secured to the housing 86. The plug 95 and sensing unit 23 thus define a pair of chambers 101 and 102 in the bore 96 at the respective ends of the valve body 93, the chambers 101 and 102 thus enclosing the ends of valve body.

The chambers 101 and 102 are adapted to be connected to the source 13 for receiving fuel under pressure therefrom, such pressure being supplied to the respective ends of the valve to shift it in opposite directions in response to a difference in pressure in the respective chambers. To this end, the housing 86 is provided with another passage 103 which is adapted to be connected at one end with the source 13 of fuel under pressure and preferably to the strainer 38. The passage 103 is connected to a pair of branch passages each adapted to communicate at one end with the passage 103 and to discharge fuel therefrom at its other end. In order to form the branch passages, the housing 86 includes a transverse bore 106 intersecting the inner end of the passage 103, the outer end of the bore 106 being closed by a plug 107. The branch passages also include a pair of spaced longitudinal bores in the housing 86 extending from the bore 106 and intersecting the valve bore 96 on either side of the sleeve 94. The lower ends of the bores are indicated at 108 and 109, and the upper ends at 111 and 112, respectively, in FIGURE 1, and are adapted to discharge fuel therefrom, in this instance to the interior of a housing 113 which encloses the electro-hydraulic device or torque motor 30. A line 114 serves to return fuel from the interior of the housing 113 to the fuel tank 34.

To prevent the flow to the chambers 101 and 102 from substantially reducing the pressure of the fuel flowing to the engine, restrictions are provided in the lower ends of the bores 108 and 109. Such restrictions in this instance comprise a pair of plugs 117 having openings or orifices 118 therethrough. The upper ends 111 and 112 of the branch passages are also provided with restrictions, formed by a pair of plugs 119 and 120, respectively, having openings or orifices 121 and 122 therethrough. According to the present invention, the opening 122 is somewhat smaller than the opening 121, such that the discharge flow of fuel from the branch passage 109 will normally be somewhat less than that through the passage 108. A corresponding increase in pressure in the chamber 102 relative to the chamber 101 is thus obtained.

With the foregoing construction, it will be apparent that differences in pressure in the chambers 101 and 102 will be applied to the ends of the valve body 93 to cause the latter to shift in the sleeve 94 and thus variably restrict the fuel passage 87 to control the amount of fuel supplied to the injectors 32.

To vary the pressures in the respective chambers 101 and 102 in response to a changed operating condition of the engine, the electro-hydraulic device or torque motor 30 is provided. The device 30, in this instance, comprises a pivotally mounted member 126 located adjacent the plugs 119 and 120 and co-operating with the openings 121 and 122 thereof for variably restricting the discharge flow of fuel from the respective openings, depending upon a particular operating condition of the engine. For moving the member 126, a pair of coils 127 and 128 are provided, each of which is respectively mounted on the arms 129 of core 131. The core 131 includes a central arm 132 providing a return flux path for the field of each of the coils 127 and 128 when energized. To this end, the member 126 is also formed of magnetic material and comprises an armature, the respective ends of which are attracted to the coils 127 and 128 when energized. The coils 127 and 128 receive signals transmitted from the magnetic amplifier 20 through wires indicated at 133.

According to the present invention, the armature 126 is pivotally supported on a shaft 135 (FIGS. 1 and 2) mounted at its ends 136 in supports 137 secured to the housing 86. The shaft 135 preferably has its ends 136 and a central portion 138 thereof formed with a rectangular cross-section to facilitate rigid securement of the armature 126 thereto and the ends of the shaft 136 to their supports 137. In order to permit movement of the armature 126 and to provide a torsional compensating force tending to maintain the armature in a neutral position with the ends thereof equidistantly spaced from the ends of the plugs 119, the shaft 135 is provided with reduced diameter portions 139 between the supports 137 and the armature 126, which permit torsional deflection of the central portion 138 of the shaft relative to its ends 136 and hence pivotal movement of the armature 126. The cross-sectional area of the reduced portions 139 is such that the magnetic force produced by the coils 127 and 128 is sufficient to overcome the torsional resistance of the shaft and pivot the armature 126 toward and from the ends of the plugs 119 and 120.

With the foregoing construction, it will be apparent that, whenever either of the coils 127 or 128 are sufficiently energized, a magnetic force will be developed tending to pivot one end of the armature 126 toward its associated coil. Such movement causes the opposite end of the armature 126 to move toward plugs 119 or 120 to thus restrict the discharge flow of fuel through the openings 121 or 122, as the case may be. By varying the energization of the coils 127 or 128, the armature 126 can be made to move through a range of positions providing a variable degree of restriction to the fuel discharging from the openings 121 or 122. A varying differential pressure may thus be obtained between the chambers 101 and 102, which results in shifting of the valve body 93 to a new position to control the restriction of the passage 87.

As previously mentioned, the opening 122 is preferably smaller than the opening 121 to provide an initial hydraulic bias or pressure differential between the chambers 101 and 102. Such bias causes the chamber 102 to be maintained at a somewhat higher pressure than the chamber 101, thereby causing the valve body 93 to shift toward the left or its full open position, as seen in FIGURE 1. The foregoing is advantageous during warmup and idle operation of the engine 13, in that at this time, full pressure from the gear pump 33 of the fuel supply apparatus 13 will be supplied to the injectors 32 of the engine.

The device 11 is adapted to control the engine throughout the operating range of the engine, that is, between idle and maximum speeds. In order to overcome the hydraulic bias when the device 11 controls the engine, the windings in the coils 127 and 128 may be constructed so that the coil 128 when energized has a greater magnetic attraction for its end of the armature 126 than the coil 127 when equally energized. Thus, the armature 126 will be caused to assume a slightly tilted position so as to restrict the openings 121 and 122 in such a manner as to equalize the discharge flow through both openings 121 and 122. Alternately, the device 11 may be adjusted so that the coil 128 is energized to a greater extent than the coil 127, when the valve 92 is positioned for a steady operating condition.

With the foregoing structure, it will be apparent that, whenever a corrective signal is received by the torque motor 30 from the device 11, and the discharge from the openings 121 and 122 is varied so as to create a pressure difference in the chambers 101 and 102, the valve body 93 will thereby shift in an appropriate direction.

The valve position sensing unit 23 comprises a housing 146 secured to the fuel control housing 86 adjacent the right end of the bore 96, as shown in FIG. 1. Mounted within the housing 146 are three axially spaced coils or windings 147, 148 and 149. A core 151 is mounted for sliding movement within the coils 147–149 and is connected to the valve body 93 as an extension thereof. Thus, movement of the valve body 93 effects a corresponding movement of the core 151. The coils 147, 148 and 149 are electrically connected to the valve position circuit 24 in the device 11, and a signal is thereby provided, corresponding to the position of the core 151 in the coils and thus the position of the valve body 93 relative to the inlet and outlet ports 98 and 99. Whenever a signal from the magnetic amplifier 20 effects a change in the position of the valve body 93, a signal of opposite polarity is provided by the valve position sensing unit 23. The signal from the unit 23 varies in magnitude with movement of the core 151 from its previous position, and when the core 151 approaches a position corresponding to the new engine operating condition and fuel demand, the resultant signal from the magnetic amplifier 20 to the torque motor 30 is proportionately reduced as the core 151 and valve body 93 shift to a new position. The valve position sensing unit 23 thus permits rapid response and movement of the body body 93 immediately after a load change occurs and effects gradual reduction of the corrective signal as the valve approaches its new position.

It will thus be apparent that the fuel control 10 provides an improved and simplified control for controlling the quantity of fuel supplied to an engine for maintaining the engine at a substantially constant speed under varying load conditions.

I claim:

1. A fuel control for controlling the flow of fuel to an engine, comprising a housing having a fuel passage therethrough adapted to be connected at one end with a source of fuel under pressure and at its other end with said engine, said housing also having a bore intersecting said fuel passage, a valve body movably mounted in said bore for variably restricting said passage to control the fuel flow to the engine, the ends of said bore being adapted to be connected to said source to receive fuel under pressure therefrom, and means responsive to an operating condition of the engine for controlling the pressure of the fuel in the respective ends of said bore to move said valve body and thereby vary the flow of fuel to the engine, the portions of said fuel passage at its intersection with said bore being offset relative to each other, and said valve body including an annular groove therearound communicating with said portions, said groove defining a shoulder movable with respect to one of said portions to variably restrict said passage.

2. A fuel control according to claim 1, in which said shoulder restricts the downstream portion of said fuel passage.

3. A fuel control for controlling the flow of fuel to an engine, comprising a housing having a fuel passage therethrough adapted to be connected at one end with a source of fuel under pressure and at its other end with said engine, said housing also having a bore intersecting said fuel passage, a valve body movably mounted in said bore for variably restricting said passage to control the fuel flow to the engine, said bore providing chambers at the respective ends of said valve body, said housing further having a pair of branch fuel passages therethrough, each branch passage having one end adapted to be connected to said source of fuel under pressure and the other end arranged to discharge fuel therefrom, said branch passages being connected to the respective chambers, and means responsive to an operating condition of the engine for controlling the flow of fuel from said other ends of said branch passages, to vary the pressures in the respective chambers to move said valve body and thereby control the flow of fuel to said engine.

4. A fuel control according to claim 3, in which said branch passages are provided with restrictions upstream of their connections with said chambers to avoid any substantial reduction of the pressure of the fuel in said fuel passage.

5. A fuel control according to claim 3, in which said branch passages are provided with restrictions at said other ends.

6. A fuel control according to claim 5, in which one of said restrictions is smaller than the other for effecting higher pressure in the chamber associated with the smaller restriction to urge said valve body in a direction to decrease the restrictions of said passage when the engine is operating at idle speed.

7. A fuel control to claim 6, in which said responsive means is normally biased in a direction to compensate for the difference in size of said restrictions at said other ends when the engine is operating above idle speed.

8. A fuel control according to claim 3, in which said responsive means includes means for variably restricting said other end of one of said branch passages and for oppositely restricting said other end of the other branch passage, in response to a changed operating condition of said engine, thereby to move said valve body in a direction to vary the flow of fuel in said fuel passage to compensate for said change.

9. A fuel control according to claim 8, in which said means for variably restricting said branch passages comprises a pivotally mounted armature and a pair of coils arranged to pivot said armature in opposite directions, said armature being disposed so as to vary the restriction of one of said branch passages when pivoted in one direction and to vary the restriction of the other of said branch passages when pivoted in the other direction.

10. A fuel control according to claim 9, in which said branch pasages at said other ends are provided with openings of different size to move said valve body to a position to decrease the restriction of said pasage when the engine is operating at idle speed, and said coils normally bias said armature in a direction to compensate for the difference in size of said openings when the engine is operating above idle speed.

11. A fuel control according to claim 9, in which said means for variably restricting said branch passages includes a shaft pivotally supporting said armature, said shaft tending to maintain said armature in a neutral position when said coils are de-energized, said shaft being torsionally resilient to permit pivotal movement of said armature when one of said coils is energized.

12. A fuel control according to claim 1, in which said shaft includes a portion of reduced cross-sectional area providing torsional resilience.

13. A fuel control according to claim 3, in which said housing has a first inlet connected to said passage and adapted to be connected to said source, and said housing has a second inlet adapted to be connected to said source and communicating with said branch fuel passages.

14. A fuel control for controlling the flow of fuel to an engine, comprising a conduit adapted to be connected at one end with a source of fuel under pressure and at its other end with said engine, shiftable valve means in said conduit for controlling the flow of fuel therethrough, means enclosing at least one end of said valve means and adapted to receive fuel under pressure from said source for applying the pressure of the fuel to said end of said valve means to shift the latter in one direction, means responsive to an operating condition of said engine for varying the pressure in said enclosing means, and means for applying an opposing force to the other end of said valve means, whereby variations of the pressure in said enclosing means is effective to shift said valve means to control the fuel flow through said conduit, said means responsive to an operating condition of said engine being adapted to be connected to a device for sensing said operating condition and for controlling said responsive means in accordance therewith, and said valve means having a portion adapted to cooperate with said device to modify the control exerted by said device on said responsive means in accordance with the shifting of said valve means.

15. A fuel control according to claim 14, in which said portion comprises an extension on said valve means.

References Cited in the file of this patent

UNITED STATES PATENTS

| | | |
|---|---|---|
| 2,516,828 | Reggio | July 25, 1950 |
| 2,534,821 | Ifield | Dec. 19, 1950 |
| 2,876,755 | Gold et al. | Mar. 10, 1959 |
| 2,896,652 | Goetsch et al. | July 28, 1959 |